United States Patent

Setser et al.

[15] 3,635,764
[45] Jan. 18, 1972

[54] COMBINED WASTEWATER TREATMENT AND POWER GENERATION

[72] Inventors: James L. Setser, Schenectady; Eugene P. Schneider, Jr., Webster, both of N.Y.

[73] Assignee: General Electric Company

[22] Filed: Jan. 2, 1969

[21] Appl. No.: 788,579

[52] U.S. Cl. ........................... 136/86 A, 136/86 C, 136/86 E, 210/65, 210/542
[51] Int. Cl. ..................................................... H01m 29/04
[58] Field of Search ..................................................... 136/86

[56] References Cited

UNITED STATES PATENTS

| 632,873 | 9/1899 | Lavison | 136/86 |
|---|---|---|---|
| 3,228,799 | 1/1966 | Rohrbach | 136/83 X |
| 3,359,136 | 12/1967 | Merten et al. | 136/86 A |
| 3,421,994 | 1/1969 | Le Duc | 136/86 X |
| 3,432,358 | 3/1969 | Cairns | 136/86 |
| 3,457,115 | 7/1969 | Kent | 136/86 |
| 3,497,388 | 2/1970 | Weissman | 136/86 X |

FOREIGN PATENTS OR APPLICATIONS

| 206,350 | 1/1909 | Germany | 136/86 A |
|---|---|---|---|
| 259,654 | 1/1968 | Austria | 136/86 |

*Primary Examiner*—Allen B. Curtis
*Attorney*—Richard R. Brainard, Paul A. Frank, Charles T. Watts, Leo I. Malossi, Frank L. Neuhauser, Oscar B. Waddell and Melvin M. Goldenberg

[57] ABSTRACT

Both apparatus and a method for the treatment of domestic wastewater are described. A substantial reduction in refractory nutrient content of such waters is effected by the addition of an electrolyte, if needed, and passage of the wastewater through battery-cell structure having as one electrode thereof a metal the oxide of which, when formed in water, acts as a flocculent. Air introduced into the cell prevents suspended sludge from settling in the cell and provides (or supplements) the depolarizing oxidant. Conduct of the process simultaneously produces direct current electrical power, as well, which may be employed to release chlorine from an aqueous chloride solution for combating pathogenic organisms in the wastewater.

6 Claims, 2 Drawing Figures

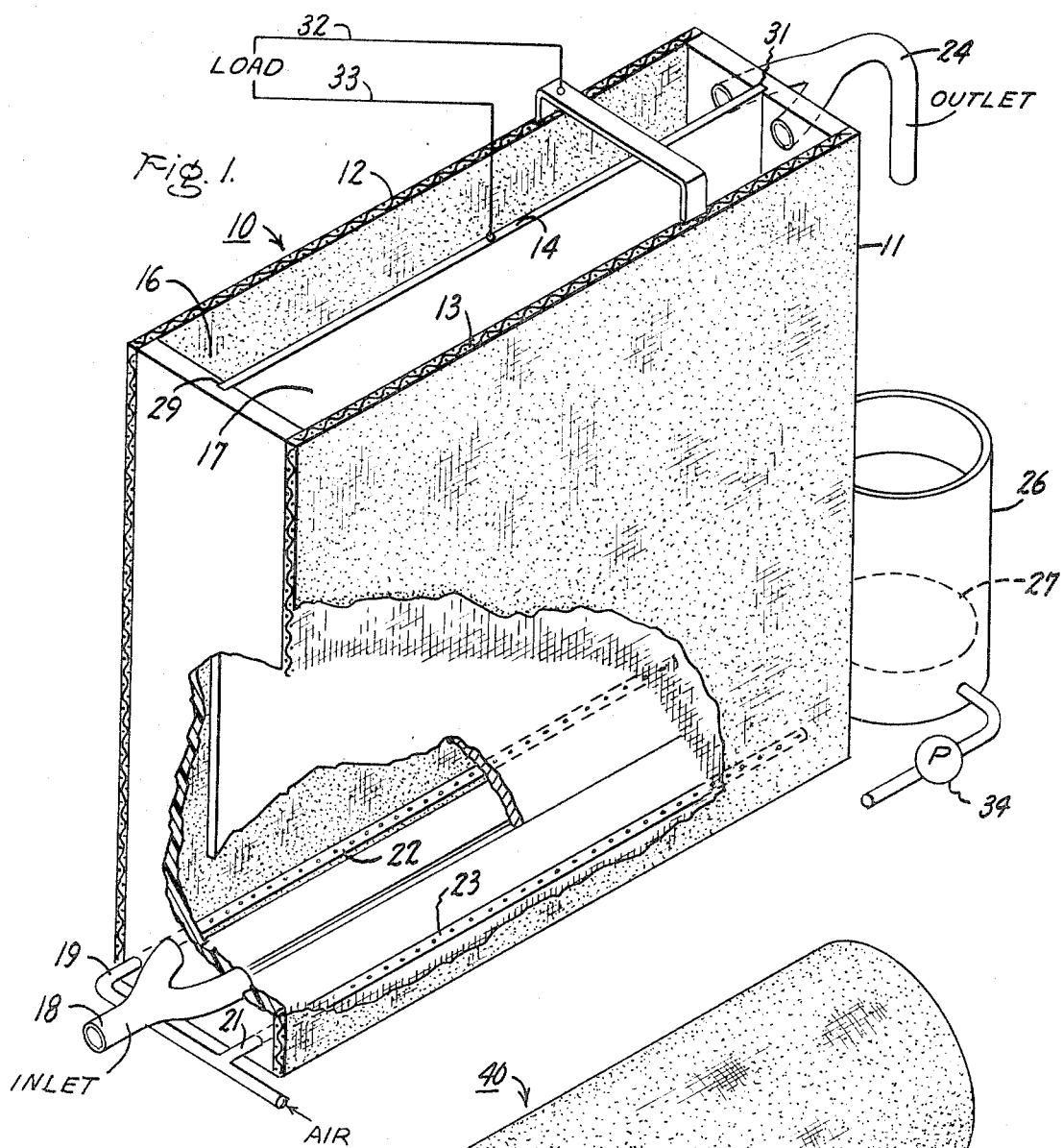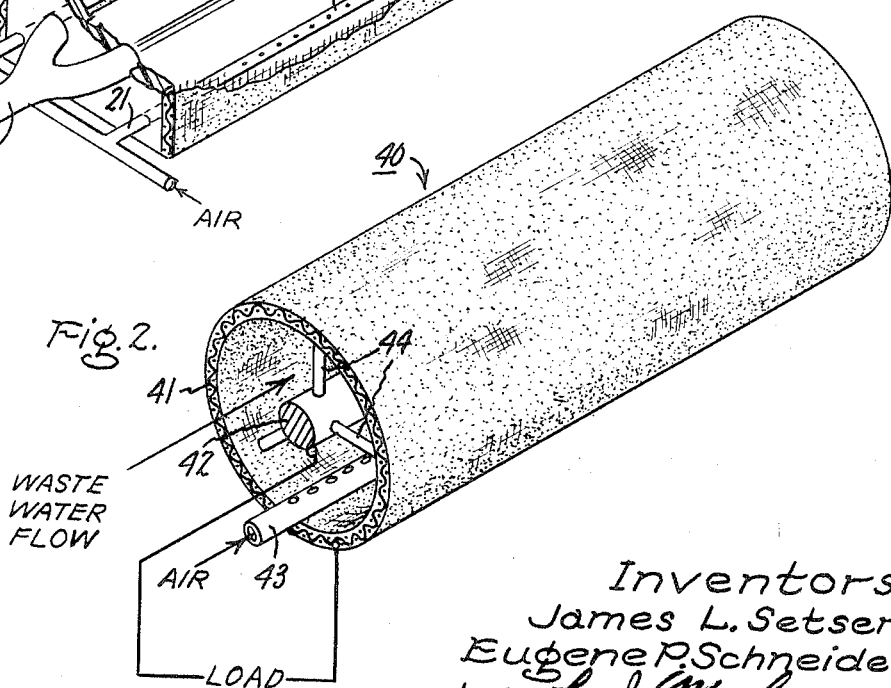

COMBINED WASTEWATER TREATMENT AND POWER GENERATION

BACKGROUND OF THE INVENTION

In general, the object in treating domestic and/or industrial wastes containing pollutional materials (hereinafter called sewage or wastewater) is to remove soluble nutrients and this is usually accomplished by the combination of biological oxidation and conversion of such nutrients to cellular material. Usually, waste treatment involves the steps of (a) settling the sewage to remove solids of large particle size, (b) subjecting the effluent from the settling tanks to some aerobic or anaerobic biological treatment, (c) separating the cell mass produced thereby from the liquid medium and (d) discharging the liquid medium for ultimate reuse. With respect to the aerobic biological treatment, this process step is generally either the trickling filtration method or the activated sludge method, though many modifications of these methods have been developed and utilized.

Such biological contact methods liberate the mineral constituents of organic matter to the wastewater. As a result large quantities of minerals are discharged daily in sewage effluent causing the pollution of lakes, streams and estuaries and causing fertilization of the receiving waters which promotes undesirable blooms in aquatic vegetation, particularly unicellular algae. Such blooms are unsightly and produce such obnoxious odors on decaying as to prevent recreational use of the water and may even be toxic to aquatic life, wild life and domestic animals.

The art is, therefore, in need of economically feasible wastewater treatment methods and apparatus developed to eliminate or reduce the quantity of carbon, nitrogen and phosphorous nutrients discharged with waste-water treatment effluents.

SUMMARY OF THE INVENTION

One effective response to this demand in the art is provided by the instant invention in which wastewater to which an electrolyte has been added if necessary, is passed through an electrical power source consisting of (a) an air electrode; (b) an electropositive anode made of a metal productive of an oxide which, when formed in water, acts as a flocculent; (c) means for introducing a stream of air into the device to float flocculated sludge formed during the process so that liquid flow will carry this suspended flocculated material out of the cell, and (d) collecting means wherein the suspended material can settle. The preferred embodiment of this invention employs magnesium as the metal anode and an electrode structure on an electronically conductive grid comprising (a) a hydrophilic binder (b) electronically conductive, catalytically active carbon particles held together by the binder and (c) a hydrophobic impregnating material.

The term "air electrode" is used in the conventional sense as meaning an electrode which is capable of electrochemically reducing oxygen from ambient air.

The general construction features of the gas-depolarized electrical power unit and of a preferred activated carbon electrode construction are disclosed in U.S. applications Ser. No. 511,392 — Kent, (now U.S. Pat. No. 3,457,115) filed Dec. 3, 1965 and Ser. No. 664,366 — Moran et al. filed Aug. 30, 1967, respectively, and both the aforementioned applications are incorporated herein by reference. Both the aforementioned applications are assigned to the assignee of the instant application. As may be seen in comparing the instant invention with the cell structures in the Kent and Moran et al. applications, the filter has been eliminated from around the anode.

BRIEF DESCRIPTION OF THE DRAWING

The nature of this invention as well as objects and advantages thereof will be readily apparent from consideration of the following specification relating to the annexed drawing in which:

FIG. 1 is a three-dimensional, cutaway view schematically illustrating the simplest structure for the conduct of the instant invention and FIG. 2 is a cross-sectional view through a modified cell showing essential components having counterparts in the structure of FIG. 1.

DESCRIPTION OF THE PREFERRED EMBODIMENT

The wastewater treatment cell 10 comprises a longitudinally extending casing 11 having as the major faces thereof the air electrodes 12 and 13. The electropositive metal plate 14 is disposed between air electrodes 12 and 13 to separate casing 11 into two longitudinally extending compartments between plate 14 and air electrode 12 spaced therefrom, on the one hand, and plate 14 and air electrode 13 spaced therefrom, on the other. These compartments are designated by the numerals 16, 17.

Input to the cell may, for example, be digester liquor to which it is desired to apply tertiary treatment or may be raw sewage in which case it is first mascerated to produce fine suspended solids in the flow. Wastewater supply conduit 18 connects with both chamber 16 and chamber 17 to admit wastewater thereto. Air is introduced via lines 19 and 21 into these same compartments via sparger pipes 22, 23 extending along the bottom of compartment 16 and 17. The treated wastewater leaves cell 10 via outlet 24 in communication with each compartment 16, 17 and into a sump 26 where the flocculated sludge 27 settles. Electrolyte from a source not shown is metered into the wastewater flow via inlet 18, if required.

Electrodes 12 and 13 may be made in the manner disclosed in either of the aforementioned applications Ser. Nos. 511,392 and 664,366 in which case air may enter cell 10 through walls 12 and 13, but the liquid contained in the cell cannot leak out. However, if preferred, these cell walls may be of nonporous block carbon and full reliance for oxygen to electrodes 12, 13 is then placed on the airflow via lines 19, 21. Thus, the sole criterion for electrodes 12 and 13 is that they be gas depolarizing, which means that molecules of oxygen coming into contact therewith are reduced electrochemically to the ionic state. These oxygen ions then react with the ions of the anode metal, which dissolve into solution, because of the electropositive nature of the metal. The metal ion and oxygen ion combined in aqueous solution to form a metal oxide hydrate flocculent. This flocculent entraps fine solid matter suspended in the wastewater to bring about precipitation thereof. However, the precipitation of the flocculated matter in the cell itself is prevented by (a) the constant introduction of air via spargers 22, 23 and (b) the hydrogen gas evolvement, which occurs simultaneously in the cell.

Magnesium, aluminum and zinc are electropositive metal anode materials useful with gas depolarizing electrodes for the production of flocculent so necessary to the practice of this invention. The following reactions appear to be among those occurring in the cell using the magnesium anode:

Magnesium
  Anode Reaction:    $Mg + 2OH^- \rightarrow Mg(OH)_2 + 2e^-$
  Cathode Reaction:  $1/2 O_2 + H_2O + 2e^- \rightarrow 2OH^-$
  Parasitic Reaction: $Mg + 2H_2O \rightarrow Mg(OH)_2 + H_2$ The electrochemical mechanisms occurring are complex and are not completely understood, however, experimental observations verify that beneficiation of the sewage and the generation of useful current do occur. In addition in each case electrolysis of water provides continuous hydrogen evolvement.

Although the metal anode would be construed predominately of the prime electrochemically active ingredient, such as magnesium, aluminum or zinc as noted above, it is conventional for significant amounts of other metals to be present as well, for example, commercially available magnesium anodes typically employed in excess of 90 percent by weight magnesium with the remaining material being principally aluminum and zinc. Additional anode ingredients may also be present to control coulombic efficiency, voltage, protect against parasitic attack or may merely be present as impurities. Slots 29, 31 readily accommodate the removal and replacement of metal anode 14 as required.

For handling larger capacity wastewater flows several such cells 10 can be placed adjacent each other and, if gas permeable wall electrodes are employed, air may also be admitted between cells.

Although the most convenient method of introducing electrolyte to the system is in the form of sodium chloride or brine, other salts may equally well serve as electrolytes, as for example, calcium sulfate or other salts present in brackish water.

Direct current power generated during wastewater treatment is available at terminals 32, 33, which power may be applied to many uses, for example, in the decomposition of an aqueous chloride solution to release chlorine gas, which may be admitted to cell 10, to sump 26 or the outflow from sump 26 for residual killing power to combat pathogens.

Also, the flocculated sludge accumulating in sump 26 may be removed and pumped via pump 34 either to a primary flocculating tank, not shown, for pretreatment of the raw sewage or to apparatus for disposition thereof by filtration and incineration.

The conduit 40 shown in FIG. 2 is a modified version of the cell 10. The exterior wall 41 is an air electrode and centrally located anode rod 42 provides the electropositive metal. Preferably air would be admitted to the device via sparger 43 although air could be admitted through the exterior wall 41 at separated points to insure sufficient flotation medium for suspending the floc generated in the system. Spider 44, which supports anode rod 42, is loose so that by disconnecting lengths of conduit 40 the depleted rods 42 may be removed and replaced.

This invention may be practiced either as a batch process or as a continuous process. Examples 1-11 set forth herein below are examples of batch treatment of wastewater or digestor liquor, while succeeding examples illustrate the application of this invention to continuous treatment. Hydrogen gas was evolved in all treatment runs.

In the examples to follow certain abbreviations have been employed and these are explained as follows:
S.S. — suspended solids
T–N — total nitrogen
T.S. — total solids
T–PO$_4$ — total phosphate
COD — Chemical oxygen demand
BOD$_5$ — 5-day biochemical oxygen demand
NH$_3$–N — nitrogen present as ammonia

EXAMPLE 1

340 ml. of settled wastewater were introduced to cell 10. This wastewater has a COD of 216 mg./l. and a pH of 7.56 mixed with NaCl to give a salt concentration of 1,000 p.p.m. NaCl.
1. Reaction time = 8 minutes
2. After reaction—color = clear
3. After reaction—odor = none
4. After reaction—grey flocculant
5. After reaction—COD = 86 mg./l.
6. After reaction—pH = 10.10

EXAMPLE 2

Several samples (340 ml.) of settled wastewater having an initial COD of 185 mg./l. were introduced into cell 10 to determine the effect of electrolyte addition:

Salt Concentration

| Sample | (p.p.m.) | COD (mg./l.) | pH |
|---|---|---|---|
| 1 | 93 | 124 | 10.45 |
| 2 | 186 | 64 | 10.68 |
| 3 | 279 | 46 | 10.77 |
| 4 | 465 | 38 | 10.79 |
| 5 | 930 | 26 | 10.77 |

In examples 1 and 2 the treatment time was 8 minutes and the current output was 1.3 amperes.

EXAMPLES 3-11

A. Test Conditions

Example 3—340 ml. sample of digestor liquor treated for 1 min.
Example 4—340 ml. sample for 1.5 min.
Example 5—340 ml. sample for 2 min.
Example 6—340 ml. sample for 3 min.
Example 7—340 ml. sample for 5 min.
Example 8—340 ml. sample for 6 min.
Example 9—340 ml. sample for 4 min.
Example 10—340 ml. sample for 8 min.
Example 11—340 ml. sample for 12 min.

The current output in each case was fixed at 12.9 milliamps/cm.$^2$ and the electrolyte was NaCl (1 percent by weight).

(B) ANALYTICAL RESULTS

| Sample | SS | TS | pH | COD | NH$_3$-N | T-N | T-PO$_4$ |
|---|---|---|---|---|---|---|---|
| Examples: | | | | | | | |
| 3–8 input | 110 | 7,005 | 11.60 | 408 | 295 | 510 | 165 |
| 3 output | 0 | 6,700 | 11.70 | 312 | 268 | 490 | 35 |
| 4 output | 5 | 6,605 | 11.75 | 336 | 275 | 490 | 24 |
| 5 output | 3 | 6,530 | 11.70 | 304 | 270 | 486 | 18 |
| 6 output | 0 | 6,490 | 11.74 | 300 | 269 | 482 | 5 |
| 7 output | 0 | 6,380 | 11.86 | 324 | 274 | 486 | 8 |
| 8 output | 5 | 6,360 | 11.75 | 320 | 270 | 496 | 11 |
| 9–11 input | 90 | 7,105 | 11.65 | 392 | 279 | 501 | 170 |
| 9 output | 0 | 6,480 | 11.76 | 306 | 256 | 472 | 16 |
| 10 output | 0 | 6,430 | 11.90 | 295 | 252 | 488 | 11 |
| 11 output | 0 | 6,300 | 11.70 | 292 | 250 | 480 | 10 |

EXAMPLE 12

| Analysis | Input (mg./l.) | Output (mg./l.) | % Reduction |
|---|---|---|---|
| pH | 7.20 | 9.85 | — |
| COD | 402 | 68 | 83.0 |
| BOD$_5$ | 259 | 24 | 87.5 |
| Total Phosphate | 25.3 | 3.2 | 83.0 |
| Total Nitrogen | 42.1 | 20.5 | 51.3 |
| Mg | 4.3 | 4.1 | — |
| Suspended Solids | 103 | 15 | 75.8 |
| Total Solids | 579 | 285 | 50.8 |
| Total Volatile Solids | 400 | 200 | 50.0 |

Salt (NaCl) concentration = 1%
Current output = 10 amps (12.9 milliamps/cm.$^2$)
Voltage output = 4 volts DC
Vol. of cell = 400 ml.
Flow rate = 100 ml./min. of premacerated raw sewage From the data set forth hereinabove it may be concluded that the parameters reflecting change in refractory nutrient content (COD, BOD$_5$, T–P, T–N and SS) have been significantly reduced indicating that there has been a substantial upgrading of the quality of the effluent in each case. Significant electrical energy was generated during the battery operation, for example, in example 12 the direct current power generated would be enough to oxidize chloride ions to chlorine gas. Hydrogen gas evolved during the process may be discarded, if desired, but may be collected, dried and used as a fuel supplement for sludge incineration.

It is to be understood that the several electrode structures shown schematically in FIGS. 1 and 2 are mounted in electrically insulated relationship to each other and that where flows of air or wastewater must be forcefully moved, pumps not shown, will be employed.

What we claim as new and desire to secure by Letters Patent of the United States is:

1. Apparatus for the simultaneous treatment of wastewater and power generation comprising in combination:

a. a compartment defined in part by two spaced longitudinally extending walls supported in electrically insulated relationship,
b. one of said walls being made of an electropositive metal the oxide of which, when formed in water, acts as a flocculent,
c. the other of said walls being an air electrode,
d. means connected to said compartment from a source of wastewater for introducing wastewater flow into said compartment for passage between said walls,
e. means for admitting a flow of air into said compartment between said walls,
f. means connected to said compartment for conducting treated water flow containing suspended flocculated solids out of said compartment after transit thereof between said walls,
g. means for receiving said treated water flow for the separation of flocculated solids therefrom and
h. first and second electrode means electrically connected to said air electrode and said electropositive metal, said electrode means being adapted to be connected to an external electrical load.

2. The apparatus for the simultaneous treatment of wastewater and power generation as recited in claim 1 wherein the electropositive metal is selected from the group consisting of magnesium, zinc and aluminum.

3. Apparatus for the simultaneous treatment of wastewater and power generation comprising in combination:
a. conduit means having as wall area thereof an air electrode, said conduit means being in flow communication with a source of wastewater,
b. an unscreened centrally located longitudinally extending rod made of an electropositive metal the oxide of which, when formed in water, acts as a flocculent,
c. means for mounting said rod in spaced electrically insulated relationship to said air electrode,
d. means extending along said conduit means for admitting a flow of air into the wastewater flow and
e. first and second electrode means electrically connected to said air electrode and said rod of electropositive metal, said electrode means being adapted to be connected to an external electrical load.

4. The apparatus for the simultaneous treatment of wastewater and power generation as recited in claim 3 wherein the electropositive metal is selected from the group consisting of magnesium, zinc and aluminum.

5. A method for reducing the refractory nutrient content of wastewater comprising the steps of:
a. adding electrolyte to wastewater to be treated,
b. passing said wastewater between and in contact with spaced longitudinally extending, first and second electrodes mounted in electrically insulated relationship, said first electrode being an air electrode and said second electrode being made of an electropositive metal the oxide of which, when formed in water, acts as a flocculent,
c. connecting said electrodes to an external electrical load for the application thereto of useful power generated,
d. simultaneously flowing air into the wastewater between said electrodes to float the flocculent generated and its refractory nutrient content,
e. conducting said treated wastewater and suspended flocculent to collecting means wherein the suspended flocculent can settle and
f. recovering said treated wastewater substantially free of flocculent.

6. The method for reducing the refractory nutrient content of wastewater as recited in claim 5 wherein power generated is used to decompose an aqueous chloride solution for the generation of chlorine gas.

* * * * *